United States Patent
Hsu et al.

(10) Patent No.: US 10,824,197 B1
(45) Date of Patent: Nov. 3, 2020

(54) FOLDING SHAFT STRUCTURE OF FLEXIBLE DISPLAY SCREEN

(71) Applicant: FIRST DOME CORPORATION, New Taipei (TW)

(72) Inventors: An Szu Hsu, New Taipei (TW); Chun Han Lin, New Taipei (TW); Yong Lin Chen, New Taipei (TW)

(73) Assignee: First Dome Corporation, New Taipei (TW)

( * ) Notice: Subject to any disclaimer, the term of this patent is extended or adjusted under 35 U.S.C. 154(b) by 0 days.

(21) Appl. No.: 16/845,536

(22) Filed: Apr. 10, 2020

(30) Foreign Application Priority Data

Sep. 19, 2019 (TW) .............................. 108133865 A (51) Int. Cl.
*G06F 1/16* (2006.01)
(52) U.S. Cl.
CPC .......... *G06F 1/1641* (2013.01); *G06F 1/1616* (2013.01); *G06F 1/1652* (2013.01)

(58) Field of Classification Search
CPC .................................................... G06F 1/1641
See application file for complete search history.

(56) References Cited

U.S. PATENT DOCUMENTS 10,001,815 B1 * 6/2018 Yao ...................... F16M 13/005
10,036,188 B1 * 7/2018 Yao ......................... E05D 3/122

* cited by examiner

*Primary Examiner* — Jerry Wu
(74) *Attorney, Agent, or Firm* — Rosenberg, Klein & Lee (57) ABSTRACT

A folding shaft structure of a flexible display screen includes an intermediate bracket, a pivot seat, and two movable seat panels. Two sides of an intermediate bracket each have an open groove. The pivot seat is disposed between the two open grooves. Two sides of the pivot seat, facing the two open grooves, are each provided with a curved guide groove and a guide pin. One end of the curved guide groove, away from an opening of the open groove, is a curved tilted end. Each guide pin is disposed close to one end of the curved guide groove away from the curved tilted end. Each movable seat panel has a protruding portion inserted in the open groove. One side of the protruding portion is provided with a protruding pin inserted into the curved guide groove and a guide groove for insertion of the guide pin.

20 Claims, 7 Drawing Sheets

FOLDING SHAFT STRUCTURE OF FLEXIBLE DISPLAY SCREEN

FIELD OF THE INVENTION

The present invention relates to a folding shaft structure of a flexible display screen, and more particularly to a folding shaft structure which can form an interval at a bending portion when folded, thereby providing a space for the flexible display screen to be bent.

BACKGROUND OF THE INVENTION

A convention pivot shaft structure is applied to an electronic device for connecting two movable parts (such as a display screen and a host). The pivot shaft structure includes two shafts that can be operated synchronously, so that the display screen and the host can be positioned at different angles when opened. It is convenient for the user to operate. In the above-mentioned structural design, when the two movable parts (the display screen and the host) are closed to each other, the two movable parts (the display screen and the host) are in a closed state with no gap (or a small gap).

Nowadays, a flexible display screen is introduced in the market. Because the flexible display screen cannot be excessively folded (the bending radius is too small, and it is easy to be damaged), the above-mentioned conventional pivot shaft structure is not suitable for the flexible display screen.

Taiwan Patent Publication No. 201813486 discloses a multi-axis hinge to improve the above-mentioned deficiency. The multi-axis hinge is used for opening and closing a first housing and a second housing that are mounted with a flexible, touch-operable display panel on the inner sides. The multi-axis hinge is mounted to the underside of the display panel. The multi-axis hinge includes a plurality of hinge rods. A first base mounted to the first housing and a second base mounted to the second housing are coupled to each other by a plurality of connecting elements. The multi-axis hinge further includes a synchronous rotating mechanism, a stop means and a friction mechanism, so that the hinge rods are interlocked or independent of each other. When the first housing and the second housing are in a closed state, a bending portion is formed inside. When the first housing and the second housing are in a fully open state, the first housing and the second housing are in the same plane.

However, the structure of the above-mentioned invention has many components and is complicated in assembly. It is difficult to reduce the production and processing costs, and is not economical for use in various products.

Accordingly, the inventor of the present invention has devoted himself based on his many years of practical experiences to solve these problems.

SUMMARY OF THE INVENTION

The primary object of the present invention is to provide a folding shaft structure of a flexible display screen. Two sides of an intermediate bracket each have an open groove that is recessed inwardly. A pivot seat is disposed between the two open grooves. Two sides of the pivot seat, facing the two open grooves, are each provided with a curved guide groove and a guide pin. One end of the curved guide groove, away from an opening of the open groove, is a curved tilted end. Each guide pin is disposed close to one end of the curved guide groove away from the curved tilted end. Two movable seat panels each have a protruding portion that is inserted in the corresponding open groove. One side of the protruding portion is provided with a protruding pin that is inserted into the curved guide groove and a guide groove. The guide pin is fitted in the guide groove. When the two movable seat panels are fully unfolded, the two movable seat panels are flush with the intermediate bracket to form a plane for supporting the flexible display screen. When the two movable seat panels are to be relatively folded, the two protruding pins are moved in the two curved guide grooves, and the two guide pins are moved in the two guide grooves, such that the respective sides of the two movable seat panels, close to the intermediate bracket, expand outwardly to form an interval, thereby providing a space for the flexible display screen to be bent.

Another object of the present invention is to provide a folding shaft structure of a flexible display screen, which has a simple structure, fewer components, and is easy to assemble, thereby reducing production cost effectively and improving product competitiveness.

In order to achieve the above objects and effects, the present invention adopts the following technical solutions. A folding shaft structure of a flexible display screen comprises an intermediate bracket, at least one pivot seat, and two movable seat panels. The intermediate bracket has a top plane facing the preset flexible display screen. Opposite two sides of the top plane each have at least one open groove that is recessed inwardly. The pivot seat is located between the two open grooves. A curved guide groove is formed in the pivot seat. One end of the curved guide groove, away from an opening of the open groove, is a curved tilted end that is bent toward the top plane. The two movable seat panels are disposed at the two sides of the top plane of the intermediate bracket, respectively. Each movable seat panel has a protruding portion that is inserted in the corresponding open groove of the pivot seat. One side of the protruding portion is provided with a protruding pin. The protruding pin is inserted into the curved guide groove. When the two movable seat plates are folded, a distal end of the protruding portion is displaced along the curved guide groove, and the protruding pin is displaced toward another end of the curved guide groove away from the curved tilted end.

According to the aforesaid structure, the pivot seat is detachably coupled to the intermediate bracket. Two sides of the pivot seat, facing the two open grooves, are symmetrically provided with guide pins in opposite directions. Each guide pin is disposed close to the end of the curved guide groove away from the curved tilted end and is adjacent to one side of the top plane. The distal end of the protruding portion of each movable seat panel is formed with a guide groove. The guide pin is fitted in the guide groove.

According to the aforesaid structure, at least one end of the intermediate bracket is provided with a rotating shaft unit. The rotating shaft unit includes two rotating shafts extending in parallel and rotatable in opposite directions synchronously. Each rotating shaft is pivotally connected with a side bracket. A movable bracket is provided between each side bracket and each movable seat panel. One side of each movable bracket is reciprocally slidable in an extending direction of the side bracket, and another side of each movable bracket is coupled to the corresponding movable seat panel.

According to the aforesaid structure, each side bracket has a hollow channel, one side of each movable bracket, facing the side bracket, is provided with a side raised portion that is inserted and slidable in the hollow channel. The other side of each movable bracket, away from the side bracket, is pivotally connected to an edge of the corresponding movable seat panel through a link set.

According to the aforesaid structure, the link set includes a plurality of parallel links. Each link has one end pivotally connected to the movable bracket and another end pivotally connected to the edge of the corresponding movable seat panel.

According to the aforesaid structure, one side of the side raised portion, away from the movable bracket, is coupled with a side coupling member that is blocked at one side of the hollow channel, so as to prevent the side raised portion from disengaging from the hollow channel.

According to the aforesaid structure, the rotating shaft unit includes a gear seat. The gear seat is formed with shaft holes through which the two rotating shafts are inserted. Ends of the two rotating shafts are coupled through a synchronous gear set so that the two rotating shafts are synchronously rotated in opposite directions.

According to the aforesaid structure, one end of the rotating shaft unit is provided with a cam seat and two cams. The cam seat is formed with through holes through which the two rotating shafts are inserted. Circumferential sides of the two through holes have a plurality of spaced recesses. The two cams are coupled to the ends of the two rotating shafts, respectively. One side of each of the two cams, facing the cam seat, has protrusions to be engaged in the corresponding recesses. At least one elastic member is disposed between the cam seat and the gear seat.

According to the aforesaid structure, another end of the rotating shaft unit is provided with a limit plate. A circumferential side of the limit plate is formed with notches corresponding to respective sides of the two rotating shafts. The ends of the two rotating shafts are coupled with pivot blocks, respectively. The two pivot blocks are pivotable in the two notches, respectively. Through the two notches, movement of the two pivot blocks is restricted, so as to restrict pivot angles of the two rotating shafts.

According to the aforesaid structure, the guide groove is a straight guide groove.

Embodiments of the present invention will now be described, by way of example only, with reference to the accompanying drawings.

DETAILED DESCRIPTION OF THE PREFERRED EMBODIMENTS

Referring to FIGS. 1 to 4, the main structure of the present invention comprises an intermediate bracket 1, a pivot seat 2, two movable seat panels 3, 4, a rotating shaft unit 5, two side brackets 6, 7, and two movable brackets 8, 9. The intermediate bracket 1 has a top plane 11 facing a preset flexible display screen A. Two opposite sides of the top plane 11 each have at least one open groove 12, 13 that is recessed inwardly.

The pivot seat 2 is disposed (or coupled to) on the underside of the top plane 11 of the intermediate bracket 1 and located between the two open grooves 12, 13. One side of the pivot seat 2, facing the open groove 12, is provided with a curved guide groove 21 and a guide pin 22. One end of the curved guide groove 21, away from the opening of the open groove 12, is a curved tilted end 211 that is bent toward the top plane 11. The guide pin 22 is disposed close to another end of the curved guide groove 21 away from the curved tilted end 211, and is adjacent to one side of the top plane 11. One side of the pivot seat 2, facing the open groove 13, is provided with a curved guide groove 23 and a guide pin 24. One end of the curved guide groove 23, away from the opening of the open groove 13, is a curved tilted end 231 that is bent toward the top plane 11. The guide pin 24 is disposed close to another end of the curved guide groove 23 away from the curved tilted end 231, and is adjacent to one side of the top plane 11.

The two movable seat panels 3, 4 are disposed at the two sides of the top plane 11 of the intermediate bracket 1, respectively. The movable seat panel 3 has a protruding portion 31 that is inserted in the open groove 12 of the pivot seat 2. One side of the protruding portion 31, facing the pivot seat 2, is provided with a protruding pin 33 extending into the curved guide groove 21 and a guide groove 32 (which may be a straight guide groove) through which the guide pin 22 is inserted. The movable seat panel 4 has a protruding portion 41 that is inserted in the open groove 13 of the pivot seat 2. One side of the protruding portion 41, facing the pivot seat 2, is provided with a protruding pin 43 extending into the curved guide groove 23 and a guide groove 42 (which may be a straight guide groove) through which the guide pin 24 is inserted.

The rotating shaft unit 5 is disposed at one end of the intermediate bracket 1. The rotating shaft unit 5 includes two rotating shafts 52, 52a extending in parallel and rotatable in opposite directions synchronously.

In an embodiment, the rotating shaft unit 5 includes a gear seat 51, two rotating shafts 52, 52a, a limit plate 53, two elastic members 54, 54a, a cam seat 55, and two cams 56, 56a. The gear seat 51 is formed with shaft holes 511, 512 through which the two rotating shafts 52, 52a are inserted. The two rotating shafts 52, 52a are coupled through a synchronous gear set 513 so that the two rotating shafts 52, 52a are synchronously rotated in opposite directions. The limit plate 53 is disposed at one end of the two rotating shafts 52, 52a. The circumferential side of the limit plate 53 is formed with notches 531, 532 corresponding to the respective sides of the two rotating shafts 52, 52a. The respective ends of the two rotating shafts 52, 52a are coupled with pivot blocks 533, 534. The two pivot blocks 533, 534 are pivotable in the two notches 531, 532, respectively. Through the two notches 531, 532, the range of movement of the two pivot blocks 533, 534 is restricted, so as to restrict the pivot angles of the two rotating shafts 52, 52a.

The cam seat 55 is formed with through holes 551, 552 through which the two rotating shafts 52, 52a are inserted. The circumferential sides of the two through holes 551, 552 have a plurality of spaced recesses 553, 554. The two cams 56, 56a are fixedly connected to the two rotating shafts 52, 52a, respectively. One side of each of the two cams 56, 56a, facing the cam seat 55, has protrusions 561, 561a to be engaged in the corresponding recesses 553, 554. The two elastic members 54, 54a are disposed between the cam seat 55 and the gear seat 51, such that the cam seat 55 maintains the elasticity against the two cams 56, 56a. When the two rotating shafts 52, 52a are rotated, the two cams 56, 56a are synchronously rotated with the protrusions 561, 561a to be engaged in the different recesses 553, 554, so that the two rotating shafts 52, 52a can be positioned at different angles.

The ends of the two side brackets 6, 7 are pivotally connected to the two rotating shafts 52, 52a, respectively. The two side brackets 6, 7 have hollow channels 61, 71.

The two movable brackets 8, 9 are disposed between the two side brackets 6, 7 and the two movable seat panels 3, 4, respectively. One side of the movable bracket 8 is provided with a side raised portion 81 that is inserted and slidable in the hollow channel 61. One side of the side raised portion 81, away from the movable bracket 8, is coupled with a side coupling member 811 that is blocked at the side of the hollow channel 61, so that the side raised portion 81 can be reciprocated in the hollow channel 61, and the side raised portion 81 won't disengage from the hollow channel 61. The other side of the movable bracket 8 is pivotally connected to the edge of the movable seat panel 3 through a link set 82. One side of the movable bracket 9 is provided with a side raised portion 91 that is inserted and slidable in the hollow channel 71. One side of the side raised portion 91, away from the movable bracket 9, is coupled with a side coupling member 911 that is blocked at the side of the hollow channel 71, so that the side raised portion 91 can be reciprocated in the hollow channel 71, and the side raised portion 91 won't disengage from the hollow channel 71. The other side of the movable bracket 9 is pivotally connected to the edge of the movable seat panel 4 through a link set 92.

In an embodiment, the link set 82 includes a plurality of parallel links 821, 822. The links 821, 822 each have one end pivotally connected to the movable bracket 8 and another end pivotally connected to the edge of the movable seat panel 3, so that the movable bracket 8 can be linked and kept parallel with the movable seat panel 3. The link set 92 includes a plurality of parallel links 921, 922. The links 921, 922 each have one end pivotally connected to the movable bracket 9 and another end pivotally connected to the edge of the movable seat panel 4, so that the movable bracket 9 can be linked and kept parallel with the movable seat panel 4.

Figure 1:
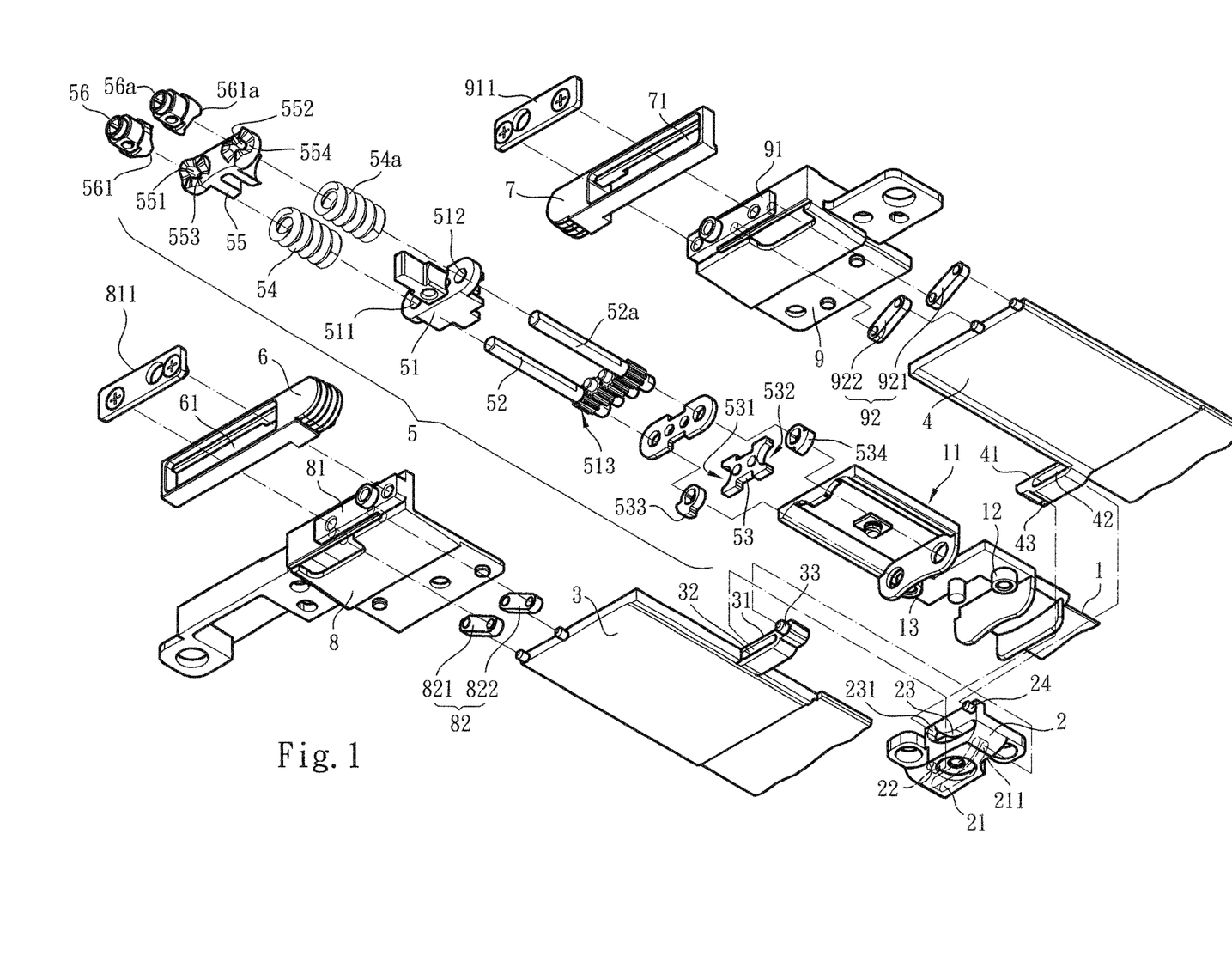
FIG. 1 is a bottom exploded view of the present invention.
Figure 2:
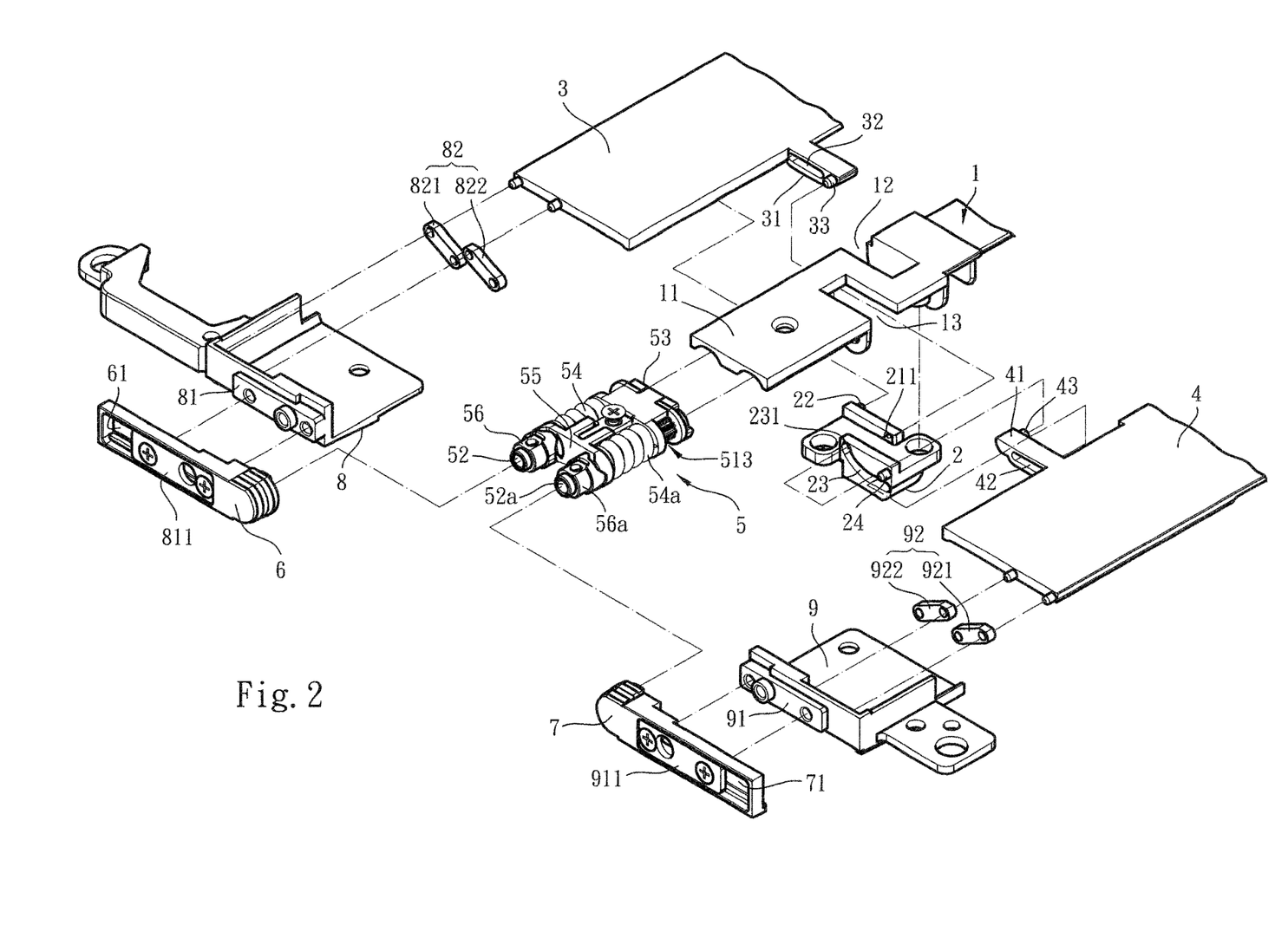
FIG. 2 is a top exploded view of the present invention.
Figure 3:
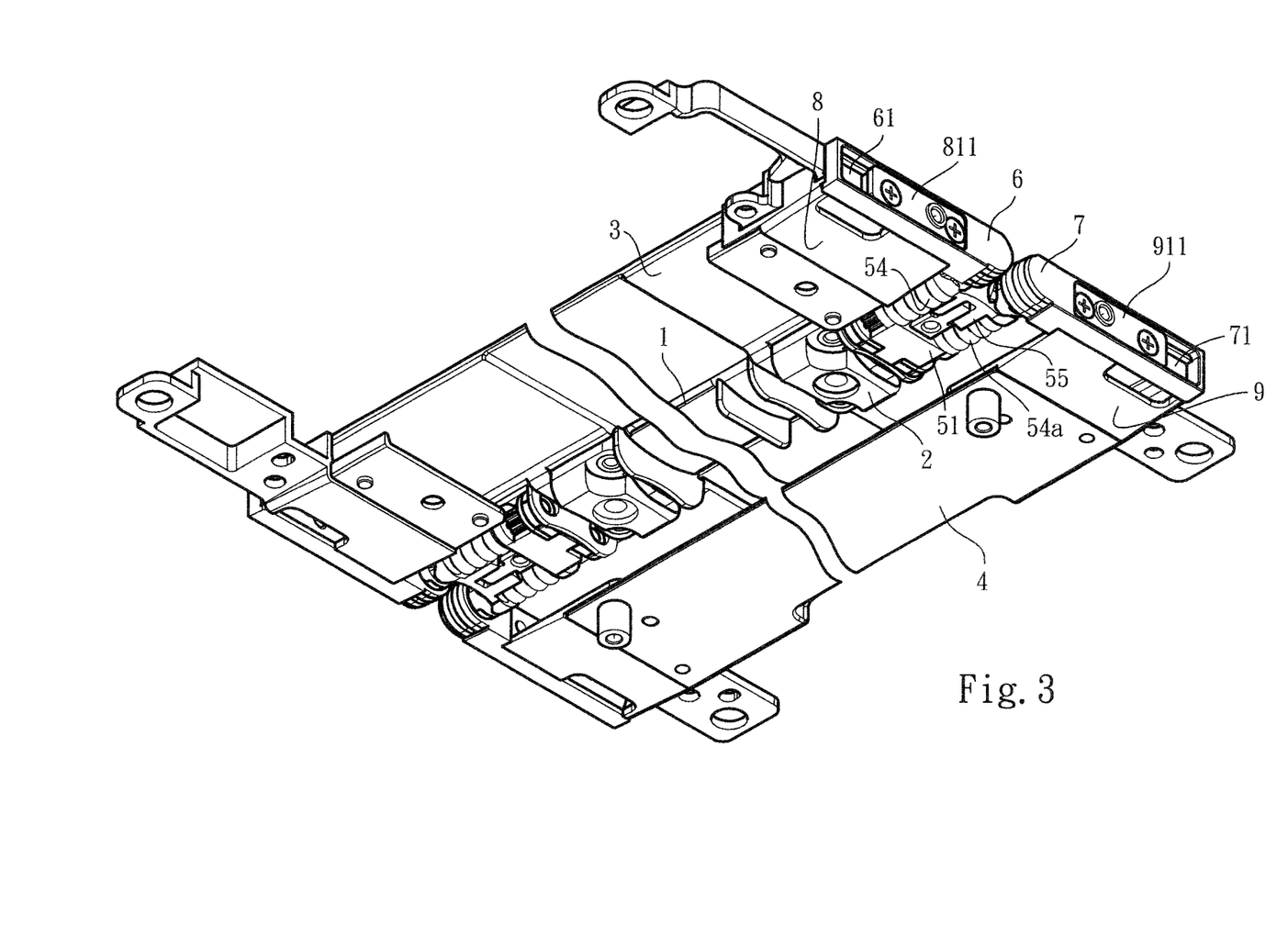
FIG. 3 is a bottom perspective view of the present invention.
Figure 4:
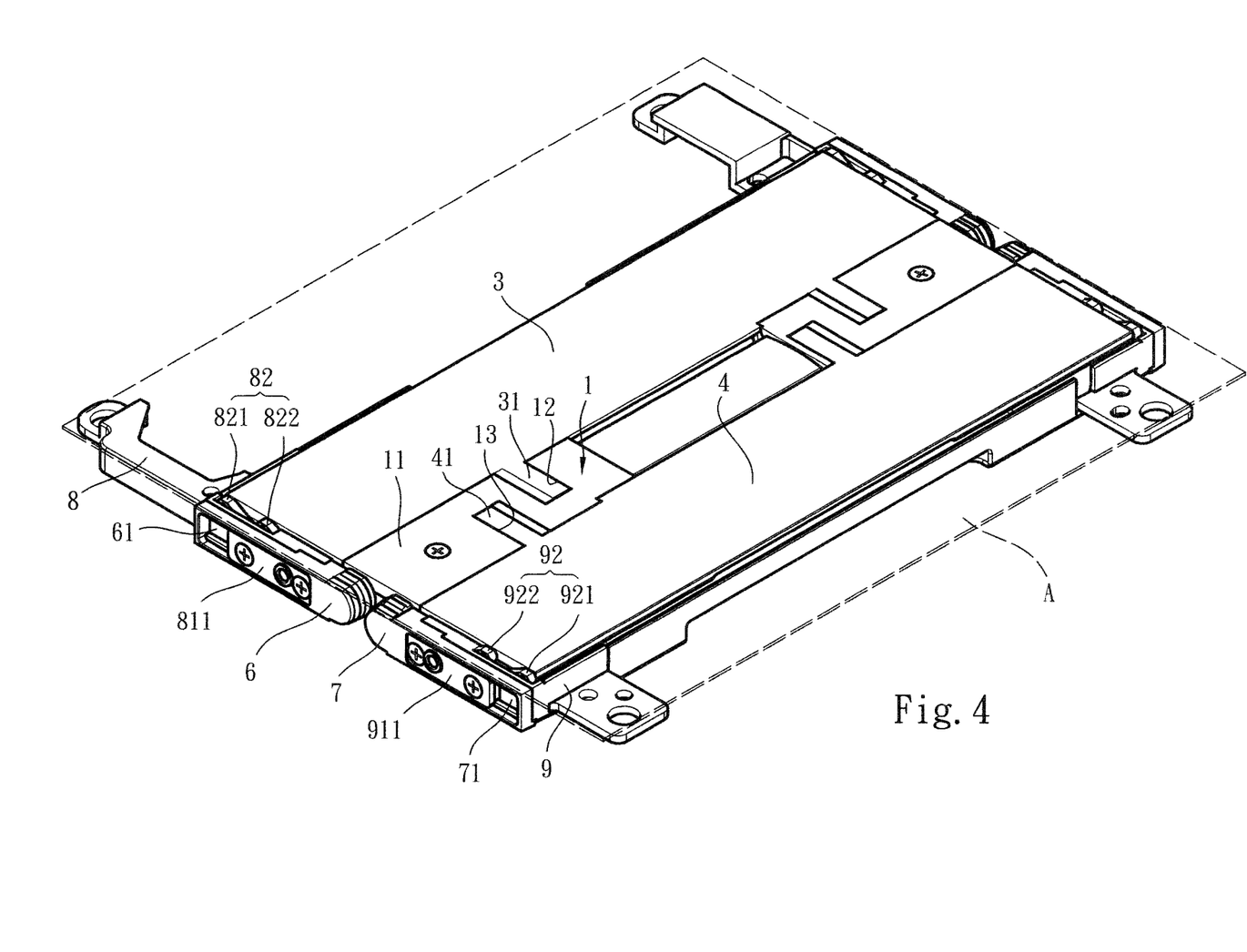
FIG. 4 is a top perspective view of the present invention.
Figure 5:
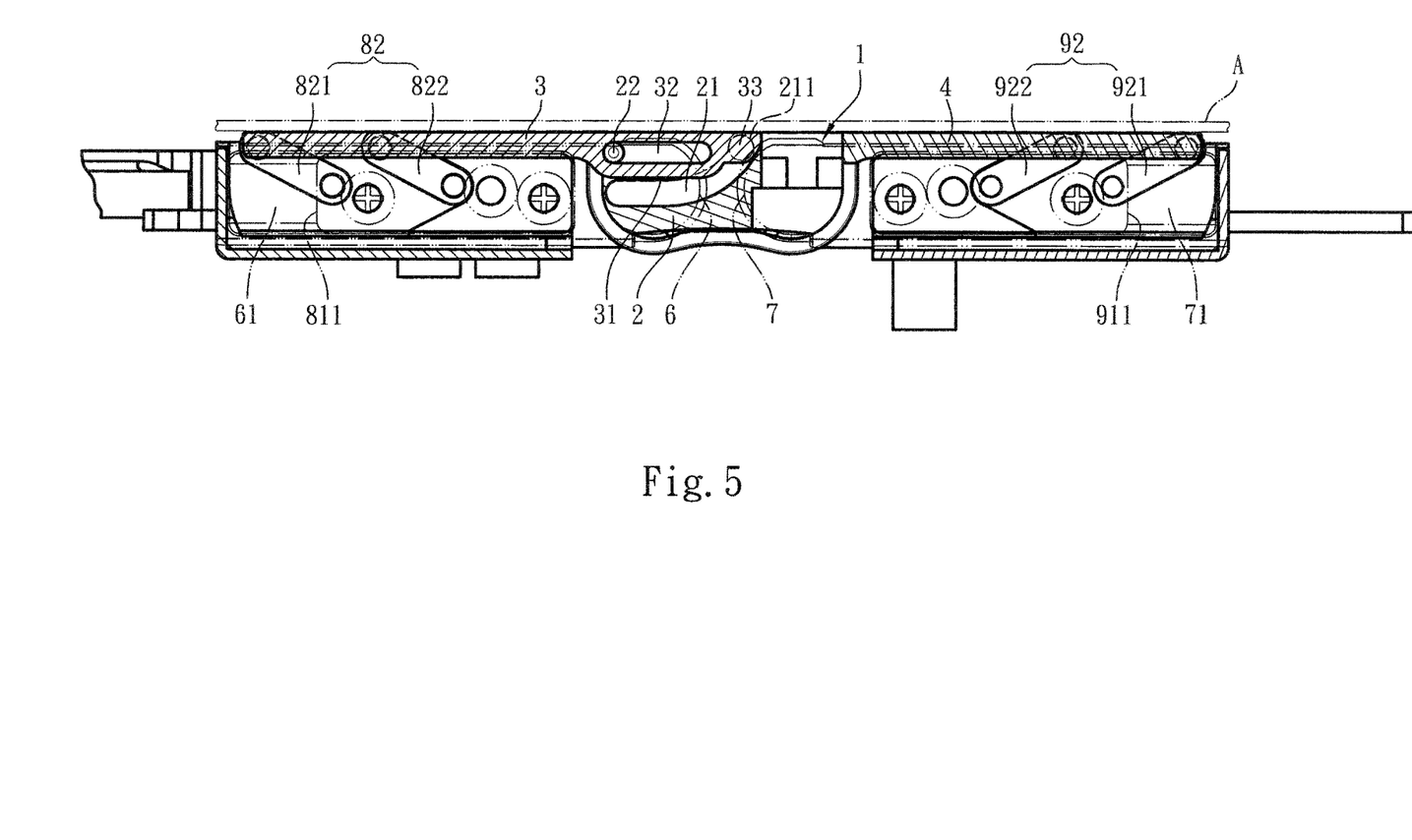
FIG. 5 is a side cross-sectional view of the present invention when the two movable seat panels are fully unfolded.
Figure 6:
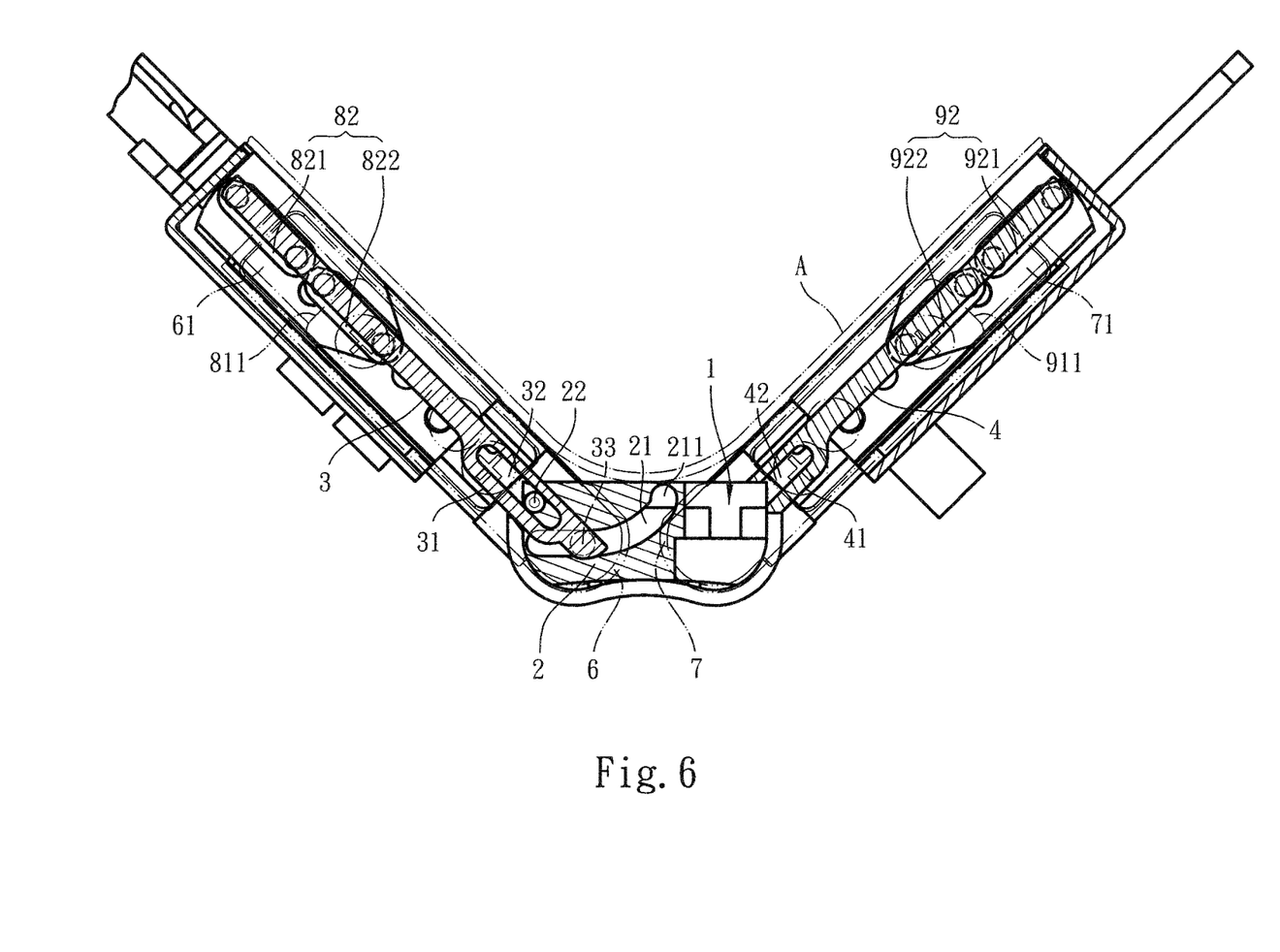
FIG. 6 is a side cross-sectional view of the present invention when the two movable seat panels are partially folded.
Figure 7:
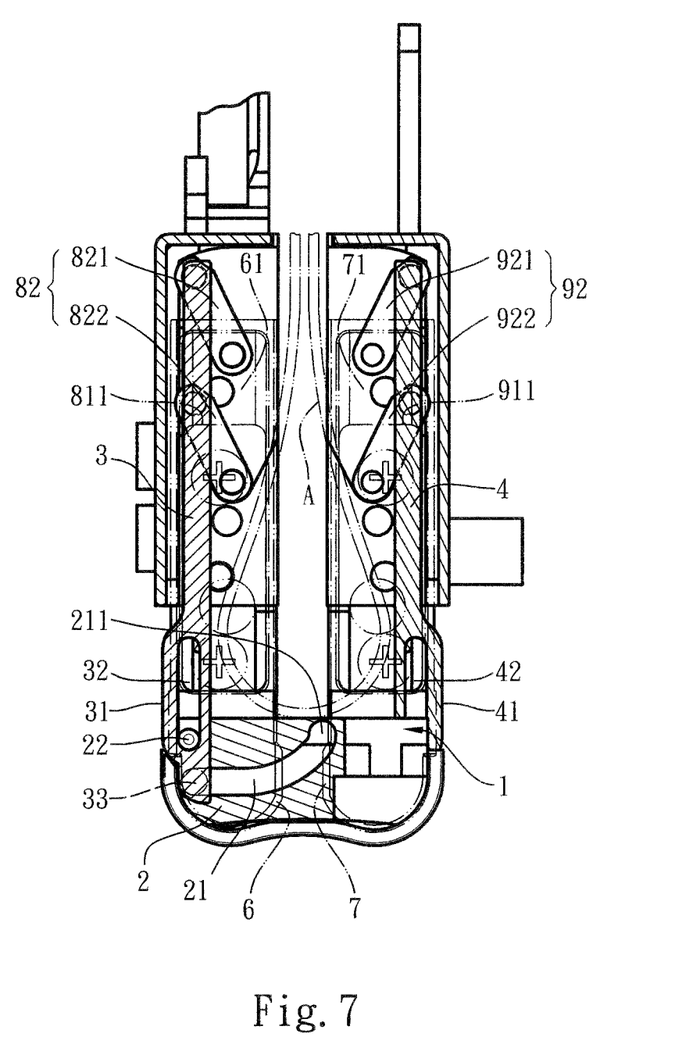
FIG. 7 is a side cross-sectional view of the present invention when the two movable seat panels are fully folded.

Referring to FIGS. 5 to 7, in use, when the two movable seat panels 3, 4 are fully unfolded, one surface of each of the two movable seat panels 3, 4 is flush with the top plane 11 to form a plane for supporting the flexible display screen A (as shown in FIG. 5). At this time, the two protruding pins 33, 43 are respectively located at the two curved tilted ends 211, 231 of the two curved guide grooves 21, 23 to be in the closest position to each other. The two guide pins 22, 24 are located in the two guide grooves 32, 42 close to the two movable seat panels 3, 4, respectively. The two side raised portions 81, 91 are located at the respective ends of the two hollow channels 61, 71 close to the rotating shaft unit 5.

As shown in FIG. 6, when the two movable seat panels 3, 4 are to be relatively folded, the two protruding pins 33, 43 are moved in the two curved guide grooves 21, 23 toward the ends away from the two curved tilted ends 211, 231, respectively. (The two protruding pins 33, 43 are gradually moved away from each other.) The two guide pins 22, 24 are moved in the two guide grooves 32, 42 toward the ends away from the two movable seat panels 3, 4, respectively. The two side raised portions 81, 91 are slid in the two hollow channels 61, 71 toward the ends away from the rotating shaft unit 5, respectively.

Finally, as shown in FIG. 7, when the two movable seat panels 3, 4 are fully folded and positioned, the two protruding pins 33, 43 are respectively located at the ends of the two curved guide grooves 21, 23 away from the two curved tilted ends 211, 231 (having the farthest distance) to form the fulcrums of the two movable seat panels 3, 4, such that the respective sides of the two movable seat panels 3, 4, close to the top plane 11, expand outwardly to form an interval, thereby providing a space for the flexible display screen A to be bent and folded (the cross-section is in a water drop shape).

In summary, the folding shaft structure of the flexible display screen of the present invention can form an interval at a bending portion when folded, so that the flexible display screen can be appropriately bent and folded without being damaged.

Although particular embodiments of the present invention have been described in detail for purposes of illustration, various modifications and enhancements may be made without departing from the spirit and scope of the present invention. Accordingly, the present invention is not to be limited except as by the appended claims.

What is claimed is:

1. A folding shaft structure of a flexible display screen, comprising:
    an intermediate bracket, having a top plane facing the preset flexible display screen, opposite two sides of the top plane each having at least one open groove that is recessed inwardly;
    at least one pivot seat, located between the at least two open grooves, a curved guide groove being formed in the pivot seat, one end of the curved guide groove, away from n opening of the open groove, being a curved tilted end that is bent toward the top plane;
    two movable seat panels, disposed at the two sides of the top plane of the intermediate bracket respectively and supporting the flexible display screen, each movable seat panel having a protruding portion that is inserted in the corresponding open groove of the pivot seat, one side of the protruding portion being provided with a protruding pin, the protruding pin being inserted into the curved guide groove in a direction substantially parallel to a plane defined by the corresponding movable seat panel;
    wherein when the two movable seat plates are folded, a distal end of the protruding portion is displaced along the curved guide groove, and the protruding pin is displaced toward another end of the curved guide groove away from the curved tilted end.

2. The folding shaft structure of the flexible display screen as claimed in claim 1, wherein the pivot seat is detachably coupled to the intermediate bracket, two sides of the pivot seat, facing the two open grooves, are symmetrically provided with guide pins in opposite directions, each guide pin is disposed close to the end of the curved guide groove away from the curved tilted end and is adjacent to one side of the top plane; the distal end of the protruding portion of each movable seat panel is formed with a guide groove, and the guide pin is fitted in the guide groove.

3. The folding shaft structure of the flexible display screen as claimed in claim 1, wherein at least one end of the intermediate bracket is provided with a rotating shaft unit, the rotating shaft unit includes two rotating shafts extending in parallel and rotatable in opposite directions synchronously, each rotating shaft is pivotally connected with a side bracket, a movable bracket is provided between each side bracket and each movable seat panel, one side of each movable bracket is reciprocally slidable in an extending direction of the side bracket, and another side of each movable bracket is coupled to the corresponding movable seat panel.

4. The folding shaft structure of the flexible display screen as claimed in claim 2, wherein at least one end of the intermediate bracket is provided with a rotating shaft unit, the rotating shaft unit includes two rotating shafts extending in parallel and rotatable in opposite directions synchronously, each rotating shaft is pivotally connected with a side bracket, a movable bracket is provided between each side bracket and each movable seat panel, one side of each movable bracket is reciprocally slidable in an extending direction of the side bracket, and another side of each movable bracket is coupled to the corresponding movable seat panel.

5. The folding shaft structure of the flexible display screen as claimed in claim 3, wherein each side bracket has a hollow channel, one side of each movable bracket, facing the side bracket, is provided with a side raised portion that is inserted and slidable in the hollow channel, and the other side of each movable bracket, away from the side bracket, is pivotally connected to an edge of the corresponding movable seat panel through a link set.

6. The folding shaft structure of the flexible display screen as claimed in claim 4, wherein each side bracket has a hollow channel, one side of each movable bracket, facing the side bracket, is provided with a side raised portion that is inserted and slidable in the hollow channel, and the other side of each movable bracket, away from the side bracket, is pivotally connected to an edge of the corresponding movable seat panel through a link set.

7. The folding shaft structure of the flexible display screen as claimed in claim 5, wherein the link set includes a plurality of parallel links, and each link has one end pivotally connected to the movable bracket and another end pivotally connected to the edge of the corresponding movable seat panel.

8. The folding shaft structure of the flexible display screen as claimed in claim 6, wherein the link set includes a plurality of parallel links, and each link has one end pivotally connected to the movable bracket and another end pivotally connected to the edge of the corresponding movable seat panel.

9. The folding shaft structure of the flexible display screen as claimed in claim 5, wherein one side of the side raised portion, away from the movable bracket, is coupled with a side coupling member that is blocked at one side of the hollow channel, so as to prevent the side raised portion from disengaging from the hollow channel.

10. The folding shaft structure of the flexible display screen as claimed in claim 6, wherein one side of the side raised portion, away from the movable bracket, is coupled with a side coupling member that is blocked at one side of the hollow channel, so as to prevent the side raised portion from disengaging from the hollow channel.

11. The folding shaft structure of the flexible display screen as claimed in claim 3, wherein the rotating shaft unit includes a gear seat, the gear seat is formed with shaft holes through which the two rotating shafts are inserted, and ends of the two rotating shafts are coupled through a synchronous gear set so that the two rotating shafts are synchronously rotated in opposite directions.

12. The folding shaft structure of the flexible display screen as claimed in claim 4, wherein the rotating shaft unit includes a gear seat, the gear seat is formed with shaft holes through which the two rotating shafts are inserted, and ends of the two rotating shafts are coupled through a synchronous gear set so that the two rotating shafts are synchronously rotated in opposite directions.

13. The folding shaft structure of the flexible display screen as claimed in claim 5, wherein the rotating shaft unit includes a gear seat, the gear seat is formed with shaft holes through which the two rotating shafts are inserted, and ends of the two rotating shafts are coupled through a synchronous gear set so that the two rotating shafts are synchronously rotated in opposite directions.

14. The folding shaft structure of the flexible display screen as claimed in claim 6, wherein the rotating shaft unit includes a gear seat, the gear seat is formed with shaft holes through which the two rotating shafts are inserted, and ends of the two rotating shafts are coupled through a synchronous gear set so that the two rotating shafts are synchronously rotated in opposite directions.

15. The folding shaft structure of the flexible display screen as claimed in claim 3, wherein one end of the rotating shaft unit is provided with a cam seat and two cams, the cam seat is formed with through holes through which the two rotating shafts are inserted, circumferential sides of the two through holes have a plurality of spaced recesses, the two cams are coupled to the ends of the two rotating shafts respectively, one side of each of the two cams, facing the cam seat, has protrusions to be engaged in the corresponding recesses, and at least one elastic member is disposed between the cam seat and the gear seat.

16. The folding shaft structure of the flexible display screen as claimed in claim 4, wherein one end of the rotating shaft unit is provided with a cam seat and two cams, the cam seat is formed with through holes through which the two rotating shafts are inserted, circumferential sides of the two through holes have a plurality of spaced recesses, the two cams are coupled to the ends of the two rotating shafts respectively, one side of each of the two cams, facing the cam seat, has protrusions to be engaged in the corresponding recesses, and at least one elastic member is disposed between the cam seat and the gear seat.

17. The folding shaft structure of the flexible display screen as claimed in claim 5, wherein one end of the rotating shaft unit is provided with a cam seat and two cams, the cam seat is formed with through holes through which the two rotating shafts are inserted, circumferential sides of the two through holes have a plurality of spaced recesses, the two cams are coupled to the ends of the two rotating shafts respectively, one side of each of the two cams, facing the cam seat, has protrusions to be engaged in the corresponding recesses, and at least one elastic member is disposed between the cam seat and the gear seat.

18. The folding shaft structure of the flexible display screen as claimed in claim 3, wherein another end of the rotating shaft unit is provided with a limit plate, a circumferential side of the limit plate is formed with notches corresponding to respective sides of the two rotating shafts, the ends of the two rotating shafts are coupled with pivot blocks respectively, the two pivot blocks are pivotable in the two notches respectively, through the two notches, movement of the two pivot blocks is restricted, so as to restrict pivot angles of the two rotating shafts.

19. The folding shaft structure of the flexible display screen as claimed in claim 5, wherein another end of the rotating shaft unit is provided with a limit plate, a circumferential side of the limit plate is formed with notches corresponding to respective sides of the two rotating shafts, the ends of the two rotating shafts are coupled with pivot blocks respectively, the two pivot blocks are pivotable in the two notches respectively, through the two notches, movement of the two pivot blocks is restricted, so as to restrict pivot angles of the two rotating shafts.

20. The folding shaft structure of the flexible display screen as claimed in claim 2, wherein the guide groove is a straight guide groove.

\* \* \* \* \*